Patented Aug. 17, 1948

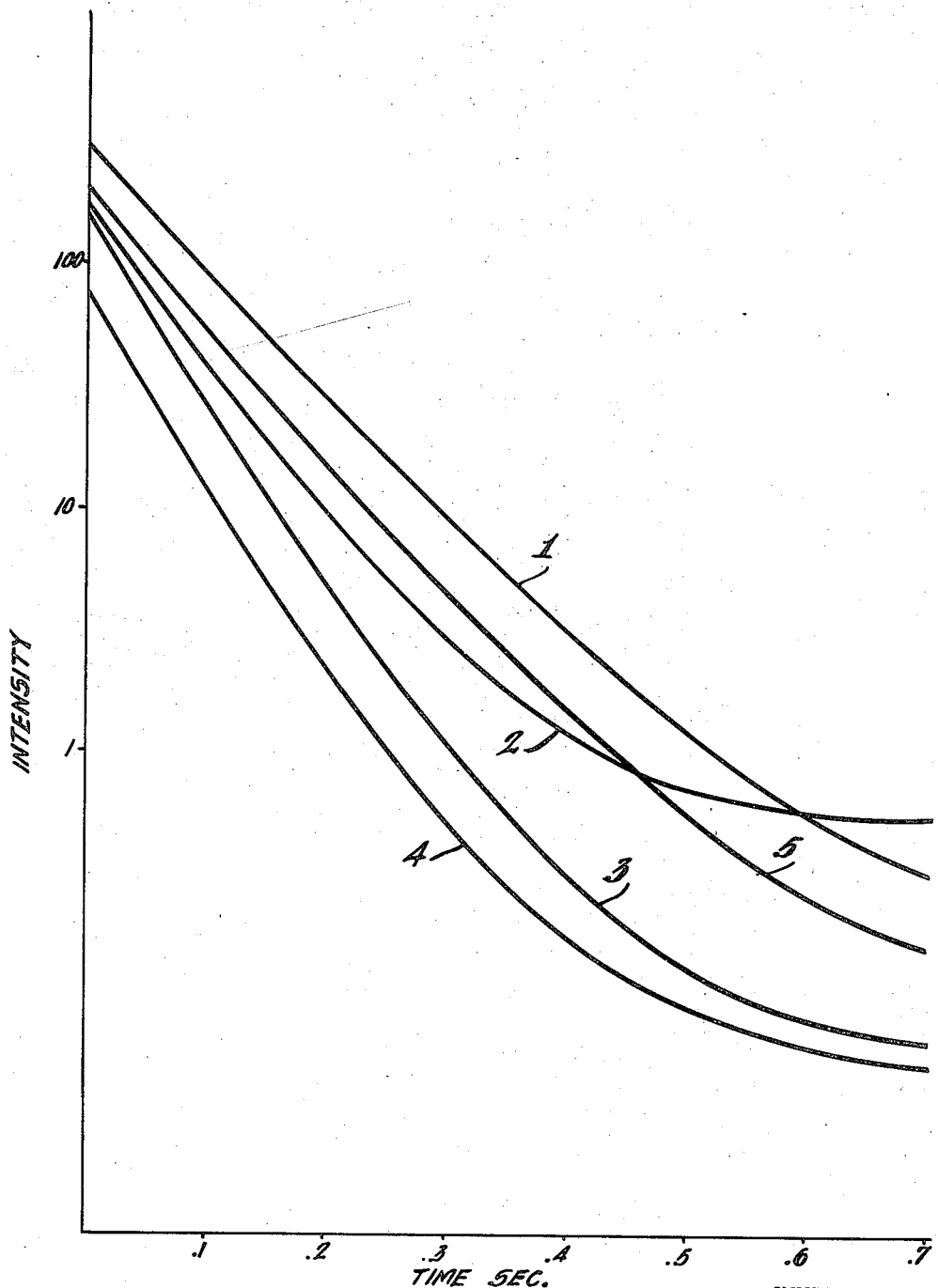

2,447,447

UNITED STATES PATENT OFFICE 2,447,447

PHOSPHOR MATERIALS

Ferd E. Williams, Princeton, N. J., assignor to Radio Corporation of America, a corporation of Delaware Application October 17, 1945, Serial No. 622,822

1 Claim. (Cl. 252—301.6)

Manganese-activated fluoride phosphors of zinc and magnesium have exponential decay times. That is, a plot of logarithm of intensity against a linear time scale results in a straight line. When plotted in logarithmic scale to the base $e(2.7218)$, these phosphors have a $$\frac{1}{e}$$

value of about 0.1 second and are used with scanning times of from one-fourth to one second. By this is meant the time required for the intensity of luminescence to decay to $$\frac{1}{2.7218}$$

of the initial intensity. The disclosure of these materials as a phosphor is contained in the application of Maggio Banca, filed April 19, 1945, Serial No. 589,269.

It is an object of this invention to provide a series of fluoride phosphors having true exponential decay characteristics with $$\frac{1}{e}$$

values less than the prior art fluorides of zinc and magnesium activated by manganese.

It is another object to provide a phosphor with true exponential decay characteristics that may be used with sweep times faster than one-fourth to one second.

Other objects will appear in the following description, reference being had to the drawing, in which the single figure gives intensity curves of the materials used in the phosphors with logarithmic ordinate and linear abscissa scales.

To obtain phosphors of true exponential characteristics with $$\frac{1}{e}$$

values less than 0.1 second, the heavier fluorides of Group II are substituted in varying proportions for zinc fluoride with manganese activator. By varying the identity and amount of the substituted fluoride phosphors having exponential decay times with $$\frac{1}{e}$$

values from 0.05 to 0.1 second, good peak values from 5300 Å. to 6300 Å. have been obtained. The composition can be varied from all zinc fluoride to all non-zinc fluoride, but this latter phosphor has low efficiency. The properties of the phosphors used in comparison with all zinc fluoride are given in the following table, molar proportions being used:

| Composition | $\frac{1}{e}$ Value | Peak |
|---|---|---|
| | Seconds | Å. |
| (1) $ZnF_2$:.06Mn | .09 | 5,870 |
| (2) $ZnF_2.CaF_2$:.012Mn | .058 | 5,610 |
| (3) $ZnF_2.SrF_2$:.012Mn | .053 | 5,390 |
| (4) $ZnF_2.BaF_2$:.012Mn | .053 | 6,220 |
| (5) $5ZnF_2.HgF_2$:.036Mn | .076 | 5,800 |

In the drawing, the curves numbered graphically illustrate the relative intensity of illumination (logarithmic ordinates) in relation to the decay time in tenths of seconds (linear abscissas). The reference numbers 1 to 5, inclusive, identify the materials in the table having the same number. By varying the proportions the decay times can be further varied.

In preparing these phosphors the mixed fluorides with the manganese activator, such as manganese nitrate or manganese fluorides, are coprecipitated and evaporated to dryness and fired at temperatures from 600° C. to 950° C. for about one-half hour in a relatively neutral atmosphere to crystallize the materials. This resultant mass is then ground to requisite fineness and applied to the phosphor screen backing by any known method.

I have disclosed certain combinations and proportions of materials giving certain results, but this is by way of example and it will be apparent that these may be varied to obtain somewhat different but comparable results.

Having described my invention, what I claim is:

A phosphor consisting of zinc fluoride a fluoride of a metal from the group consisting of calcium, strontium, barium and mixtures thereof, and a manganese activator said material having substantially the molar proportions given by the formula $ZnF_2 \cdot XF_2:0.012Mn$ in which X is the metal from the said group.

FERD E. WILLIAMS.

REFERENCES CITED

The following references are of record in the file of this patent:

UNITED STATES PATENTS

| Number | Name | Date |
|---|---|---|
| 1,624,443 | St. John | Apr. 12, 1927 |

OTHER REFERENCES

Wieno-Harms, Handbuch Der Experimental Physik, vol. XXIII, page 1, page 450.